United States Patent Office 3,476,774
Patented Nov. 4, 1969

3,476,774
HINDERED PHENOL STABILIZED MALEIC ANHYDRIDE AND ITS USE IN MAKING ALKENYL SUCCINIC ANHYDRIDES
Edward F. Zaweski, Royal Oak, Mich., and Allen H. Filbey, Baton Rouge, La., assignors to Ethyl Corporation, New York, N.Y., a corporation of Virginia
No Drawing. Filed Oct. 7, 1965, Ser. No. 493,904
Int. Cl. C07d 5/08
U.S. Cl. 260—346.8                                5 Claims

ABSTRACT OF THE DISCLOSURE

Maleic anhydride is thermally stabilized by hindered phenolic stabilizers such as 4,4' - methylenebis(2,6 - di-tert - butylphenol). Use of the stabilized maleic anhydride in the preparation of alkenyl succinic anhydrides by reaction of maleic anhydrides with olefins gives increased yields.

---

This invention relates to a process for producing an olefinically substituted carboxylic acid or derivative by the reaction of an olefin with an $\alpha,\beta$ - unsaturated carboxylic acid or derivative. In particular, this invention relates to a process for producing an alkenyl succinic anhydride by the reaction of an olefin with maleic anhydride in the presence of a hindered phenol stabilizer.

Olefins are known to react with $\alpha,\beta$ - unsaturated carboxylic acids or derivatives thereof to produce olefinically substituted carboxylic acid or derivatives. For example, olefinic hydrocarbons react with maleic anhydride to yield olefinically substituted succinic anhydrides. These materials are useful as fuel and lubricant additives, and are known to inhibit corrosion and to improve the dispersancy of fuels and lubricants. They are also useful as chemical intermediates and can be reacted with alkyl amines or polyalkylene amines to yield amide derivatives of the olefinically substituted succinic anhydride. These amide derivatives are excellent dispersing agents for hydrocarbon lubricating oils.

In reacting olefins with $\alpha,\beta$ - unsaturated carboxylic acids or derivatives, particularly with maleic anhydride, temperatures in excess of 200° C. are usually employed to cause the reaction to proceed at an acceptable rate. However, $\alpha,\beta$ - unsaturated carboxylic acids, especially maleic anhydride, are unstable at these temperatures. Maleic anhydride begins to decompose at 150° C. Under proper conditions this decomposition can become violent and has even resulted in explosions ("Manufacturing Chemists Association," Case History No. 622, May 25, 1960, Washington, D.C.). It has been reported (J. of Chem. Eng. Data, 8 (4), pages 620–623, (1963)), that the decomposition of maleic anhydride is accompanied by $CO_2$ evolution and it has also been found to yield water and a tar-like residue which is extremely difficult to clean from reaction vessel since it is insoluble in all common solvents.

Furthermore, when reaction olefins with maleic anhydride it is desirable that the product be an olefinically substituted succinic anhydride. When maleic anhydride decomposes during the reaction the water produced converts the succinic anhydride to succinic acid, resulting in a further loss of reactant and, even more serious, contamination of the product with materials that are extremely difficult to remove. Thus, a need exists for an improved process for reacting olefins with $\alpha,\beta$-unsaturated carboxylic acids or derivatives thereof which will proceed at a useful rate and will not result in substantial decomposition of the reactants with subsequent loss of raw material and contamination of product.

An object of this invention is to provide an improved process for reacting olefins with $\alpha,\beta$ - unsaturated carboxylic acids or derivatives thereof. A further object is to provide a process for reacting olefins with maleic acid or anhydride with decreased decomposition. A specific object of this invention is to provide a process for reacting a high molecular weight polybutene with maleic anhydride with decreased decomposition.

These and other objects are acomplished by providing an improved process for preparing an olefinically substituted carboxylic acid or derivative thereof comprising the reaction of an olefin with an $\alpha,\beta$ - unsaturated carboxylic acid or derivative thereof in the presence of a hindered phenol which is substantially non-reactive with the olefin, $\alpha,\beta$-unsaturated carboxylic acid or derivative thereof, or with the products in the reaction. Hindered phenols useful as heat stabilizers in this invention are those phenols wherein at least one position ortho to the phenolic hydroxyl group is substituted with an alpha-branched substituent. An alpha-branched substituent is one which is bonded to the phenolic benzene ring through a secondary or tertiary carbon atom such as the o-sec-butyl or o-tert-butyl radical. In the more preferred hindered phenols at least one position ortho to the phenolic hydroxyl group is substituted with an alpha-branched radical and the total number of carbon atoms in the substituents located ortho to each phenolic hydroxyl radical is at least 4. The preferred hindered phenols are shown by the following classes of hindered phenols.

One preferred class of hindered phenols useful as heat stabilizers in this invention are those having the formula:

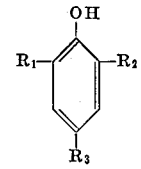

wherein $R_1$ and $R_3$ are selected from the group consisting of hydrogen, halogen, alkyl radicals containing from 1–18 carbon atoms, aryl radicals containing from 6–18 carbon atoms, aralkyl radicals containing from 7–18 carbon atoms, cycloalkyl radicals containing from 6–18 carbon atoms, radicals having the formula $OR_4$, wherein $R_4$ is selected from the group consisting of alkyl radicals containing from 1–12 carbon atoms, aryl radicals containing from 6–18 carbon atoms and alkaryl radicals containing from 7–18 carbon atoms, and —$CH_2OR_4$ wherein $R_4$ is the same as above; and $R_2$ is selected from the group consisting of alpha-branched alkyl radicals containing from 3–18 carbon atoms, cycloalkyl radicals containing from 6–18 carbon atoms, and alpha-branched aralkyl radicals containing from 8–18 carbon atoms.

Some examples of these compounds are:

2,6-di-tert-butylphenol
2,4,6-tri-tert-butylphenol
2,6-di-tert-butyl-4-methylphenol
o-Tert-butylphenol
2-methyl-6-tert-butylphenol
2,4,6-tri-tert-octylphenol
2-tert-butyl-6-(α-methylbenzyl)phenol
2,6-di(α-methylbenzyl)phenol
2,4-di(α,α-dimethylbenzyl)phenol
2,4-di-tert-octylphenol
2,4,6-tri(α-methylbenzyl)phenol
2,6-di-tert-butyl-4-hydroxy anisole
2,6-di-tert-butyl-4-methoxyphenol
2-methyl-6-cyclohexylphenol
2,6-di-tert-octyl-4-decoxyphenol
2-tert-butyl-4-chlorophenol
2-(α-methylbenzyl)-4-bromo-6-octadecylphenol
2-octadecyl-4-iodo-6-dodecylphenol
2-butoxy-4-phenyl-6-sec-octylphenol
2-(α-methylbenzyl)-6-bromophenol
2-sec-butyl-4,6-diiodophenol
2,6-di-tert-butyl-α-methoxy-p-cresol Another preferred class of stabilizers are those having the formula:

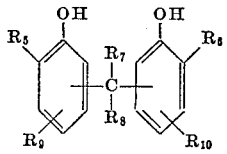

wherein $R_5$ and $R_6$ are selected from the group consisting of alpha-branched alkyl radicals containing from 3–18 carbon atoms, cycloalkyl radicals containing from 6–18 carbon atoms and alpha-branched aralkyl radicals containing from 8–18 carbon atoms; $R_7$ and $R_8$ are selected from the group consisting of hydrogen, alkyl radicals containing from 1–6 carbon atoms, cycloalkyl radicals containing from 6–12 carbon atoms, aryl radicals containing from 6–12 carbon atoms, and aralkyl radicals containing from 7–12 carbon atoms; and $R_9$ and $R_{10}$ are selected from the group consisting of hydrogen, alkyl radicals containing from 1–18 carbon atoms, aralkyl radicals containing from 7–18 carbon atoms, halogens, and alkoxy radicals containing from 1–12 carbon atoms.

Some examples of this class of compounds are:

4,4'-methylenebis(2,6-diisopropylphenol)
2,2'-ethylidenebis(4,6-di-tert-octylphenol)
4,4'-butylidenebis(6-tert-butyl-m-cresol)
4,4'-(1-methyl-propylidene)-bis-(2-tert-butyl-5-methylphenol)
4,4'-isopropylidenebis(2,6-di-tert-butylphenol)
4,4'-isopropylidenebis[2,6-di(α-methylbenzyl)phenol]
4,4'-methylenebis[2-tert-butyl-6-(α-methylbenzyl)phenol]
2,2'-(1-methyl-pentylidene)-bis-(2-tert-butyl-4-methylphenol)
4,4'-benzylidenebis(2,6-di-tert-butylphenol)
4,4'-methylenebis(2,6-di-tert-butylphenol)
4,4'-(1-methyl-3-carboxypropylidene)-bis-(2,6-di-tert-butylphenol)
4,4'-cyclohexylidenebis(2,6-di-tert-butylphenol)
2,2'-methylenebis(4-chloro-6-tert-butylphenol)

Still another preferred class of stabilizers are those having the formula:

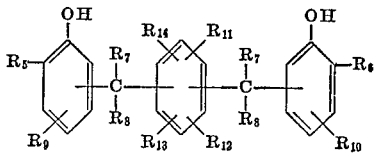

wherein $R_5$ and $R_6$ are selected from the group consisting of alpha-branched alkyl radicals containing from 3–18 carbon atoms, cycloalkyl radicals containing from 6–18 carbon atoms and alpha-branched aralkyl radicals containing from 8–18 carbon atoms; $R_7$ and $R_8$ are selected from the group consisting of hydrogen, alkyl radicals containing from 1–6 carbon atoms, cycloalkyl radicals containing from 6–12 carbon atoms, aryl radicals containing from 6–12 carbon atoms, and aralkyl radicals containing from 7–12 carbon atoms; and $R_9$ and $R_{10}$ are selected from the group consisting of hydrogen, alkyl radicals containing from 1–18 carbon atoms, aralkyl radicals containing from 7–18 carbon atoms, halogens, and alkoxy radicals containing from 1–12 carbon atoms; and $R_{11}$, $R_{12}$, $R_{13}$ and $R_{14}$ are selected from the group consisting of hydrogen, the hydroxyl radical, alkyl radicals containing from 1–6 carbon atoms, radicals having the formula $OR_{15}$, wherein $R_{15}$ is selected from the group consisting of alkyl radicals containing from 1–6 carbon atoms, aryl radicals containing from 6–18 carbon atoms, aralkyl radicals containing from 7–18 carbon atoms, radicals having the formula:

wherein $R_{16}$ is selected from the group consisting of alkyl radicals containing from 1–6 carbon atoms, aryl radicals containing from 6–12 carbon atoms, and aralkyl radicals containing from 7–18 carbon atoms; and radicals having the formula:

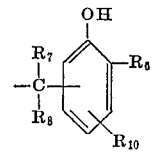

wherein $R_6$ is selected from the group consisting of alpha-branched alkyl radicals containing from 3–18 carbon atoms, cycloalkyl radicals containing from 6–18 carbon atoms and alpha-branched aralkyl radicals containing from 8–18 carbon atoms; $R_7$ and $R_8$ are selected from the group consisting of hydrogen, alkyl radicals containing from 1–6 carbon atoms, cycloalkyl radicals containing from 6–12 carbon atoms, aryl radicals containing from 6–12 carbon atoms, and aralkyl radicals containing from 7–12 carbon atoms; and $R_{10}$ is selected from the group consisting of hydrogen, alkyl radicals containing from 1–18 carbon atoms, aralkyl radicals containing from 7–18 carbon atoms, halogens, and alkoxy radicals containing from 1–12 carbon atoms.

Some examples of these compounds are:

2,6-di(3,5-di-tert-butyl-4-hydroxybenzyl)-4-tert-butylphenol
2,4,6-tri(3,5-di-tert-butyl-4-hydroxybenzyl)phenol
1,3,5-trimethyl-2,4,6-tri(3,5-di-tert-butyl-4-hydroxybenzyl)benzene
2,4-di(3-tert-butyl-4-hydroxy-5-dodecylbenzyl)phenol acetate
2,6-di(3,5-di-tert-butyl-4-hydroxybenzyl)-4-tert-butylphenyl acetate
2,6-di(3,5-di-tert-butyl-4-hydroxybenzyl)-4-tert-butylanisole
1,2,4,5-tetramethyl-3,6-di(3,5-di-tert-butyl-4-hydroxybenzyl)benzene
2,6-di(2-hydroxy-3-tert-butyl-5-methylbenzyl)-4-tert-butylethoxybenzene
1,3,5-tri(3,5-di-tert-butyl-4-hydroxybenzyl)benzene Another preferred class of heat stabilizers are sulfur-bridged hindered phenols having the formula:

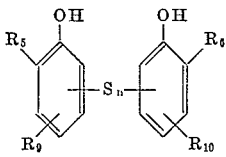

wherein $n$ is an integer from 1–3, $R_5$ and $R_6$ are selected from the group consisting of alpha-branched alkyl radicals containing from 3–18 carbon atoms, cycloalkyl radicals containing from 6–18 carbon atoms and alpha-branched aralkyl radicals containing from 8–18 carbon atoms; and $R_9$ and $R_{10}$ are selected from the group consisting of hydrogen, alkyl radicals containing from 1–18 carbon atoms, aralkyl radicals containing from 7–18 carbon atoms, halogens, and alkoxy radicals containing from 1–12 carbon atoms.

Some examples of these hindered phenols are:

4,4′-thiobis-(2-tert-butyl-5-methylphenol)
4,4′-thiobis-(2-methyl-6-tert-butylphenol)
2,2′-dithiobis-(4,6-di-tert-butylphenol)
4,4′-thiobis[2,6-di(α-methylbenzyl)phenol]
4,4′-thiobis-(2,6-di-tert-butylphenol)
4,4′-thiobis-(6-cyclohexyl-o-cresol)
4,4′-trithiobis-[2,6-di(α-methylbenzyl)phenol]

Another preferred class of additives are the hindered phenols having the formula:

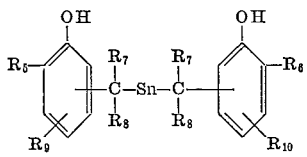

wherein $n$ is an integer from 1–3, $R_5$ and $R_6$ are selected from the group consisting of alpha-branched alkyl radicals containing from 3–18 carbon atoms, cycloalkyl radicals containing from 6–18 carbon atoms and alpha-branched aralkyl radicals containing from 8–18 carbon atoms; $R_7$ and $R_8$ are selected from the group consisting of hydrogen, alkyl radicals containing from 1–6 carbon atoms, cycloalkyl radicals containing from 6–12 carbon atoms, aryl radicals containing from 6–12 carbon atoms, and aralkyl radicals containing from 7–12 carbon atoms; and $R_9$ and $R_{10}$ are selected from the group consisting of hydrogen, alkyl radicals containing from 1–18 carbon atoms, aralkyl radicals containing from 7–18 carbon atoms, halogens, and alkoxy radicals containing from 1–12 carbon atoms.

Some examples of these hindered phenols are:

α,α′-Thiobis-(2,6-di-tert-butyl-p-cresol)
α,α′-Thiobis-[2,6-di(α-methylbenzyl)-p-cresol]
α,α′-Thiobis-[4-tert-octyl-6-(α,α-dimethylbenzyl)-o-cresol]
α,α′-Dithiobis-(2-methyl-6-sec-butyl-p-cresol)
α,α′-Trithiobis-(2-tert-butyl-4-methyl-o-cresol)

Another preferred class of stabilizers are nitrogen containing hindered phenols having the formula:

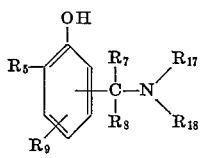

wherein $R_5$ is selected from the group consisting of alpha-branched alkyl radicals containing from 3–18 carbon atoms, cycloalkyl radicals containing from 6–18 carbon atoms and alpha-branched aralkyl radicals containing from 8–18 carbon atoms; $R_7$ and $R_8$ are selected from the group consisting of hydrogen, alkyl radicals containing from 1–6 carbon atoms, cycloalkyl radicals containing from 6–12 carbon atoms, aryl radicals containing from 6–12 carbon atoms, and aralkyl radicals containing from 7–12 carbon atoms; and $R_9$ is selected from the group consisting of hydrogen, alkyl radicals containing from 1–18 carbon atoms, aralkyl radicals containing from 7–18 carbon atoms, halogens, and alkoxy radicals containing from 1–12 carbon atoms; and $R_{17}$ and $R_{18}$ are selected from the group consisting of alkyl radicals containing from 1–12 carbon atoms, aryl radicals containing from 6–18 carbon atoms, aralkyl radicals containing from 7–18 carbon atoms, and radicals having the formula:

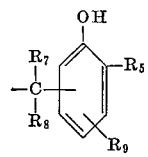

wherein $R_5$ is selected from the group consisting of alpha-branched alkyl radicals containing from 3–18 carbon atoms, cycloalkyl radicals containing from 6–18 carbon atoms and alpha-branched aralkyl radicals containing from 8–18 carbon atoms; $R_7$ and $R_8$ are selected from the group consisting of hydrogen, alkyl radicals containing from 1–6 carbon atoms, cycloalkyl radicals containing from 6–12 carbon atoms, aryl radicals containing from 6–12 carbon atoms, and aralkyl radicals containing from 7–12 carbon atoms; and $R_9$ is selected from the group consisting of hydrogen, alkyl radicals containing from 1–18 carbon atoms, aralkyl radicals containing from 7–18 carbon atoms, halogens, and alkoxy radicals containing from 1–12 carbon atoms.

Some examples of these hindered phenols are:

2,6-di-tert-butyl-α-dimethylamino-p-cresol
2,6-di(α-methylbenzyl)-α-dimethylamino-p-cresol
2-tert-butyl-6-(α-methylbenzyl)-α-diphenylamino-p-cresol
α,α′,α″-Nitrilotis-(2,6-di-tert-butyl-p-cresol)
2-methyl-6-(α-methylbenzyl)-α-diphenylamino-p-crosol
2-tert-dodecyl-4-methyl-α-dibenzylamino-o-cresol Still another preferred class of stabilizers are the hindered phenols shown by the formula:

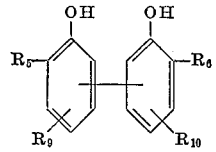

wherein $R_5$ and $R_6$ are selected from the group consisting of alpha-branched alkyl radicals containing from 3–18 carbon atoms, cycloalkyl radicals containing from 6–18 carbon atoms and alpha-branched aralkyl radicals containing from 8–18 carbon atoms; and $R_9$ and $R_{10}$ are selected from the group consisting of hydrogen, alkyl radicals containing from 1–18 carbon atoms, aralkyl radicals containing from 7–18 carbon atoms, halogens, and alkoxy radicals containing from 1–12 carbon atoms.

Some examples of this class of hindered phenols are:

4,4′-bis(2,6-di-tert-butylphenol)
2,2′-bis(4-methyl-6-tert-butylphenol)

A preferred embodiment of the present invention is a process as set forth above wherein the α,β-unsaturated carboxylic acid or derivative is maleic anhydride or a substituted maleic anhydride.

In a most highly preferred embodiment of the present process, the reaction is carried out in the presence of a compound having the formula:

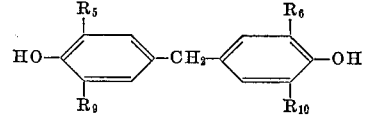

wherein $R_9$ and $R_{10}$ are alkyl radicals containing from 1–18 carbon atoms and $R_5$ and $R_6$ are alpha-branched alkyl radicals containing from 3–18 carbon atoms. The most highly preferred heat stabilizing additive used in the practice of this invention is 4,4'-methylenebis(2,6-di-tert-butylphenol).

The improved process described in this invention is carried out by reacting an olefin with an α,β-unsaturated carboxylic acid or derivative in the presence of one of the thermal stabilizing compounds previously described. The quantity of thermal stabilizing compound employed varies and can be adjusted to provide the required stabilization depending upon the inherent instability of the α,β-unsaturated carboxylic acid or derivative employed and the severity of the reaction conditions in the process. The more unstable the α,β-unsaturated carboxylic acid or derivative or the more severe the reaction conditions, the more stabilizer required. In general, from about 0.001 to about 5 weight percent of stabilizer, based on the total weight of the reaction mass, will be sufficient. A more preferred concentration range is from about 0.1 to about 3 weight percent stabilizer, and a most preferred concentration range is from about 0.5 to about 1 weight percent stabilizer, based upon the total weight of the reaction mass.

Olefins used in the reaction include any material capable of substitution into an α,β-unsaturated carboxylic acid or derivative, yielding the corresponding olefinically substituted carboxylic acid or derivative. Preferred olefins are the high molecular weight olefins. The more preferred olefins are the high molecular weight olefins formed by the polymerization of low molecular weight monoolefins, such as ethylene, propylene butylene, isobutylene, pentene, isopentene, hexene, styrene, α-methylstyrene, and the like, including olefins formed by the copolymerization of mixtures of the foregoing materials. Highly preferred olefins are those made from polymerizing monoolefins containing from 2–6 carbon atoms, such that the resulting olefin has a molecular weight of from about 300 to 3000. The most highly preferred olefin used in the process of this invention is a polybutene with a molecular weight of from about 700 to 1600.

Although the present invention is primarily concerned with a process employing an α,β-unsaturated dicarboxylic acid anhydride (viz, maleic anhydride) reactant, it is also applicable to similar processes involving the reaction of an olefin with other derivatives of α,β-unsaturated carboxylic acids, such as esters, amides, or imides.

By far, the most important use of the improvement provided herein is in the reaction of an olefin with an α,β-unsaturated carboxylic acid anhydride. The α,β-unsaturated carboxylic acid anhydride used in the process are any of those wherein the α,β-unsaturation is sufficiently reactive to react with an olefin, resulting in the formation of the corresponding olefinically substituted carboxylic acid anhydride. Preferred α,β-unsaturated carboxylic acid anhydrides are the α,β-unsaturated dicarboxylic acid anhydrides. The improvement in the process is particularly manifest in a reaction employing maleic anhydride or substituted maleic anhydride. As previously discussed, maleic anhydride is known to be extremely unstable. When heated above 150° C. extensive decomposition occurs. This decomposition occurs even in the absence of oxygen and is, therefore, not an oxidative phenomenon. The stabilizers provided by this invention effectively prevent or substantially reduce such decomposition.

The mole ratio of the olefin reactant to the maleic anhydride can vary over a wide range. Either reactant can be used in excess. It is usually preferred not to use an excess of the anhydride because it is generally more expensive and more difficult to separate from the product than is the olefin reactant. A preferred ratio of olefin to maleic anhyrdide is from about 0.9 to about 2.0. A more preferred range is from about 0.95 to about 1.5, and a most preferred range is from about 1.0 to about 1.2.

The reaction between the olefin and maleic anhydride can be conducted in a solvent or without a solvent. Normally a solvent is preferred because it helps keep the reactants in a liquid state at lower temperatures and also serves to permit better mixing of the heat stabilizing additive with the maleic anhydride. This is because maleic anhydride is solid at room temperature and the use of a solvent permits mixing of the stabilizer with the maleic anhydride before substantial heat is applied. When a solvent is employed the preferred solvents are those that are inert under reaction conditions and have sufficient solvent power to dissolve the reactants. This includes hydrocarbons, halogenated hydrocarbons, ethers, ketones, esters, and the like. The preferred solvents are hydrocarbons or halogenated hydrocarbons. The more preferred solvents are the aromatic hydrocarbons or chlorinated aromatic hydrocarbons having a boiling point of from about 100–200° C. Examples of these include toluene, ethyl benzene, xylene, o-dichlorobenzene, chlorobenzene, o-chlorotoluene, and the like. A most preferred solvent is xylene.

When a solvent is used the quantity varies with the nature of the reactants and the solvent power of the particular solvent employed. Usually enough solvent is used so that the reaction mass is liquid at temperatures below 50° C. In general, from about 5 to 100 weight percent of solvent, based upon the weight of the reactants, gives good results. A more preferred solvent quantity is from about 10–50 weight percent solvent, and a most preferred solvent quantity is from about 15–25 weight percent, based upon the weight of the other reactants employed.

The reaction can be conducted in the presence of air or under an inert atmosphere, such as nitrogen, because this removes the danger of vapor explosion or possible partial oxidation of the olefin.

The pressure at which the reaction is conducted is not critical and will depend upon the vapor pressure of the reactants and solvent at the reaction temperature employed. When low molecular weight olefin reactants are used, pressures up to about 500 p.s.i.g. are obtained at the preferred reaction temperatures. When high molecular weight olefins are used, such as those having a molecular weight of from 700–1600, pressures at preferred reaction temperatures will normally be determined by the vapor pressure of the solvent and are usually on the order of from 25–100 p.s.i.g.

Temperatures employed in the process should be high enough to promote the reaction at a reasonable rate, but not so high as to cause decomposition of the reactants or products. One of the features of this invention is that it permits the reaction of olefins with maleic anhydride to be carried out at temperatures much higher than heretofore practical. Previously, temperatures were limited because of the tendency of the maleic anhydride to decompose when heated above 150° C. Higher reaction temperatures, now possible through the use of the present invention, are preferred because they cause the reaction between the maleic anhydride and the olefin to proceed at a much higher rate. Generally, the reaction can be carried out at temperatures from about 150–350° C. A preferred temperature range is from about 200–300° C., and a most preferred temperature range is from 225–275° C.

The benefits derived from the practice of this invention are shown by the following two experiments. These were both substantially the same, except that one was carried out in the presence of 4,4'-methylenebis(2,6-di-tert-butylphenol), a thermal stabilizer of this invention, and the other was carried out without a thermal stabilizer. All parts are parts by weight unless otherwise indicated.

EXAMPLE 1

Reaction of polybutene with maleic anhydride without stabilizer

To a pressure vessel equipped with a stirrer and temperature measuring means was charged 480 parts of a polybutene having a molecular weight of 980, 51.4 parts of maleic anhydride and 100 parts of solvent (o-dichlorobenzene). The pressure vessel was sealed, flushed with nitrogen and heated to 234° C. over a period of 40 minutes. The reaction mass was maintained at 234–236° C. for a period of 6 hours and then cooled to room temperature. Infrared analysis of the reaction product showed that 63 percent of the maleic anhydride was converted to an alkenyl succinic anhydride. The reaction mixture was dark amber with particles of sludge suspended therein.

EXAMPLE 2

Reaction of polybutene with maleic anhydride in the presence of a heat stabilizer To a reaction vessel equipped as in Example 1 was charged 480 parts of polybutene having a molecular weight of 960, 51.4 parts of maleic anhydride, 100 parts of solvent (xylene) and 2.12 parts of stabilizer, 4,4'-methylenebis(2,6 - di - tert - butylphenol). The reaction vessel was sealed, flushed with nitrogen, and then heated to 235° C., while stirring. The reaction mass was maintained at 235° C. under slight pressure (46 p.s.i.g.) for a period of 8 hours. No pressure increase was observed during this period. Following the reaction period, the vessel was cooled and the contents discharged. The reaction vessel was extremely clean and infrared analysis of the reaction product showed the conversion of the maleic anhydride to ankenyl succinic anhydride to be 78 percent complete.

The foregoing comparative experiments show that a 15 percent yield improvement was obtained over a similar reaction conducted in the absence of a heat stabilizer of the present invention. Even greater benefits were obtained in other work, as shown below.

EXAMPLE 3

To a reaction vessel equipped as in Example 1 was charged 480 parts of polybutene (molecular weight 960), 51.4 parts of maleic anhydride and 2.12 parts of 4,4'-methylenebis(2,6-di-tert-butylphenol). The reaction vessel was then sealed, flushed with nitrogen, and heated to 235° C. over a period of 32 minutes. The reaction mass was maintained at this temperature for 6 hours, following which it was cooled and discharged. Infrared analysis of the reaction product showed that 77 percent of the maleic anhydride had been converted to the corresponding alkenyl succinic anhydride.

EXAMPLE 4

To a reaction vessel equipped as in Example 1 was charged 480 parts of polybutene (molecular weight 960), 51.4 parts maleic anhydride, 100 parts of solvent (xylene) and 2.12 parts of 4,4'-methylenebis(2,6-di-tert-butylphenol). The reaction vessel was sealed, flushed with nitrogen and then heated to 250° C., while stirring, over a period of 38 minutes. The reaction contents were maintained at 248°–252° C. for a period of 8 hours, during which time samples were periodically withdrawn. The samples were subjected to infrared analysis to determine the percent conversion of the maleic anhydride to the corresponding alkenyl succinic anhydride. The following table shows the results of these determinations.

| Sample Number: | Reaction Time (in hrs.) | Percent Yield |
|---|---|---|
| 1 | 2 | 70 |
| 2 | 4 | 82 |
| 3 | 6 | 86 |
| 4 | 8 | 86 |

As the above table shows, the maximum yield was obtained after only 6 hours. Furthermore, as the above table shows, the yield after only 2 hours at 250° C., made possible through use of the present heat stabilizer, exceeded the yield obtained after 6 hours at 235° C. in the absence of a heat stabilizer, as shown in Example 1. Furthermore, the reaction product was much cleaner than that obtained under similar conditions in the absence of the present heat stabilizers.

EXAMPLE 5

To a reaction vessel equipped as in Example 1 was charged 552 parts of polybutene (molecular weight 960), 59.2 parts maleic anhydride, 115 parts of solvent (xylene) and 2.5 parts 4,4'-methylenebis(2,6-di-tert-butylphenol). The reaction vessel was sealed, flushed with nitrogen and heated to 250° C., while stirring. The reaction mass was maintained at 248.5°–252.5° C. for 5 hours. No significant pressure change was observed during this period. Following this period, the reaction vessel contents were cooled and discharged. Infrared analysis of the reaction product showed that 84.5 percent of the maleic anhydride had been converted to the corresponding alkenyl succinic anhydride. The reaction vessel was found to be very clean following the discharge of the product.

In the foregoing experiments, $\alpha,\beta$-unsaturated carboxylic acid derivatives other than maleic anhydride may be employed, and, in like manner, other olefinic materials may be used such as a polypropylene having a molecular weight of 700, a polybutene with a molecular weight of 3000, a polyethylene with a molecular weight of 300, and the like. In all cases, improved results will be obtained in the presence of a stabilizer described in this invention. Furthermore, in the foregoing experiments any of the previously described heat stabilizers can be profitably employed including, in particular, those shown in the examples following each preferred class of thermal stabilizer.

As previously mentioned, maleic anhydride decomposes when heated. The decomposition is accelerated by the presence of impurities, especially in basic materials such as alkali and alkaline earth metals and amines. This decomposition can even result in an explosion ("Manufacturing Chemist Association," Case History No. 622, May 25, 1960, Washington, D.C.). The additives of this invention have an inhibiting effect on maleic anhydride decomposition. Thus, another embodiment of the present invention is maleic anhydride containing a stabilizing quantity of the thermal stabilizers previously defined.

The thermal stabilization of maleic anhydride compositions with a hindered phenol additive was demonstrated in the following experiment. To a pressure vessel equipped with an agitator and temperature and pressure measuring means was added 51 parts of maleic anhydride and 500 parts of xylene. Following this, there was added 2.1 parts of 4,4'-methylenebis(2,6-di-tert-butylphenol). The pressure vessel was sealed and flushed with nitrogen. While stirring, it was heated to 99° C., at which temperature the vessel pressure was vented to zero p.s.i.g. The vessel was then sealed and heated to 250° C. At this temperature the pressure was 141 p.s.i.g. Any decomposition of maleic anhydride would be evidenced by a rise in pressure since the decomposition of maleic anhydride produces carbon dioxide and water, which would raise the internal pressure of the vessel. The maleic anhydride composition was maintained at 250° C. for 3 hours, during which time no increase in pressure was detected. Therefore, a hindered phenol of this invention effectively stabilized the maleic anhydride composition against thermal degradation.

The thermal stabilizers may be incorporated into the maleic anhydride by melting the maleic anhydride at about 53° C. and then dissolving it in the molten anhydride, or it may be added to a solution of the anhydride in a suitable solvent.

The quantity required depends upon the effect of the particular stabilizer used, because not all stabilizers are equally effective in inhibiting the decomposition. However, a less effective stabilizer may be less costly, so a number of factors must be considered when making the choice. In general, from 0.001 to 5 weight percent of stabilizer, based upon maleic anhydride, is effective. A more preferred range is from about 0.1 to 3 weight percent stabilizer, and a most preferred range usually providing adequate protection is from 0.5 to 1 weight percent stabilizer.

The following examples illustrate this aspect of the invention. All parts are parts by weight unless otherwise indicated.

EXAMPLE 6

In a storage vessel equipped with heater and stirring means is placed 1,000 parts of maleic anhydride. The maleic anhydride is heated to 60° C. causing it to melt, and 1.0 part of 4,4'-methylenebis(2,6-di-tert-butylphenol) is added. It is stirred until the stabilizer is completely dissolved in the maleic anhydride, resulting in a maleic anhydride of increased stability.

EXAMPLE 7

In a storage vessel equipped as in Example 6 is placed 1,000 parts of maleic anhydride and 150 parts of o-dichlorobenzene containing 10 parts of 2,4,6-tri-tertbutylphenol. The mixture is stirred and heated until the maleic anhydride goes into solution, resulting in a maleic anhydride solution of improved stability that can be stored over long periods at elevated temperatures without substantial decomposition.

EXAMPLE 8

In a reaction vessel equipped as in Example 6 is placed 500 parts of xylene and 50 parts of 4,4'-thiobis(2,6-di-tert-butylphenol). The mixture is heated to 75° C. and 1,000 parts of granular maleic anhydride added, forming a stabilized maleic anhydride solution which can be stored in a liquid state for long periods without decomposition, and used in a chemical reaction at elevated temperatures without substantial decomposition and subsequent maleic anhydride loss.

EXAMPLES 9–72

In like manner, each of the stabilizers listed as examples following each of the preferred classes is blended with 1,000 parts of maleic anhydride, yielding a maleic anhydride composition having superior heat stability.

We claim:
1. In a process for preparing an alkenyl succinic anhydride comprising the reaction of an olefin formed by the polymerization of low molecular weight monoolefins containing from 2–6 carbon atoms and having a molecular weight of from about 300–3000 with maleic anhydride, the improvement comprising conducting said reaction in the presence of a thermal stabilizing quantity of from about 0.001 to 5 weight percent, of a hindered phenol which is substantially nonreactive with said olefin and said maleic anhydride, said hindered phenol having the formula:

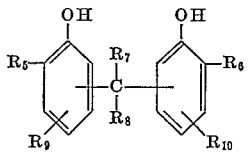

wheren $R_5$ and $R_6$ are selected from the group consisting of alpha-branched alkyl radicals containing from 3–8 carbon atoms and α-methylbenzyl radicals; $R_7$ and $R_8$ are selected from the group consisting of hydrogen and alkyl radicals containing from 1–6 carbon atoms and $R_9$ and $R_{10}$ are selected from the group consisting of alkyl radicals containing from 1–8 carbon atoms, α-methylbenzyl radicals and chlorine.

2. A maleic anhydride composition consisting essentially of maleic anhydride and a thermal stabilizing quantity, from about 0.001–5 weight percent, of a hindered phenol which is substantially nonreactive with said maleic anhydride, said hindered phenol having the formula:

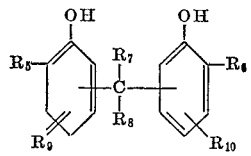

wherein $R_5$ and $R_6$ are selected from the group consisting of alpha-branched alkyl radicals containing from 3–8 carbon atoms and α-methylbenzyl radicals; $R_7$ and $R_8$ are selected from the group consisting of hydrogen and alkyl radicals containing from 1–6 carbon atoms and $R_9$ and $R_{10}$ are selected from the group consisting of alkyl radicals containing from 1–8 carbon atoms, α-methylbenzyl radicals and chlorine.

3. In a process for preparing an alkenyl succinic anhydride comprising the reaction of an olefin formed by the polymerization of low molecular weight monoolefins containing from 2–6 carbon atoms and having a molecular weight of from about 300–3000 with maleic anhydride, the improvement comprising conducting said reaction in the presence of a thermal stabilizing quantity, of from about 0.001 to 5 weight percent, of 4,4'-methylenebis(2,6-di-tert-butylphenol).

4. In a process for preparing an alkenyl succinic anhydride comprising the reaction of an olefin formed by the polymerization of low molecular weight monoolefins containing from 2–6 carbon atoms and having a molecular weight of from about 300–3000 with maleic anhydride, the improvement comprising conducting said reaction in the presence of a thermal stabilizing quantity, of from about 0.001 to 5 weight percent, of 4,4'-butylidenebis(6-tert-butyl-m-cresol).

5. A maleic anhydride composition consisting essentially of maleic anhydride and a thermal stabilizing quantity, from about 0.001–5 weight percent, of 4,4'-methylenebis(2,6-di-tert-butylphenol).

References Cited

UNITED STATES PATENTS

| | | | |
|---|---|---|---|
| 2,496,358 | 2/1950 | Ross et al. | 260—346.8 |
| 3,056,805 | 10/1962 | Gleason | 260—346.8 |

ALEX MAZEL, Primary Examiner

BERNARD I. DENTZ, Assistant Examiner

U.S. Cl. X.R.

252—404

UNITED STATES PATENT OFFICE
CERTIFICATE OF CORRECTION

Patent No. 3,476,774      Dated November 4, 1969

Inventor(s) Edward F. Zaweski and Allen H. Filbey

It is certified that error appears in the above-identified patent and that said Letters Patent are hereby corrected as shown below:

Column 12, in Claim 2, that portion of the formula reading

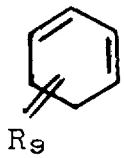 should read 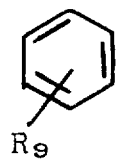

SIGNED AND
SEALED
FEB 17 1970

(SEAL)
Attest:

Edward M. Fletcher, Jr.
Attesting Officer

WILLIAM E. SCHUYLER, JR.
Commissioner of Patents